US012770531B2

(12) United States Patent
Villamena

(10) Patent No.: US 12,770,531 B2
(45) Date of Patent: Oct. 20, 2026

(54) FREESTANDING SENSORY LEARNING AND DISPLAY TOOL WITH INCORPORATED REUSABLE WRITING SURFACE

(71) Applicant: Tara Villamena, New York, NY (US)

(72) Inventor: Tara Villamena, New York, NY (US)

( * ) Notice: Subject to any disclaimer, the term of this patent is extended or adjusted under 35 U.S.C. 154(b) by 150 days.

(21) Appl. No.: 18/943,430

(22) Filed: Nov. 11, 2024

(65) Prior Publication Data

US 2026/0134793 A1 May 14, 2026

(51) Int. Cl.

| | |
|---|---|
| ***G09B 17/00*** | (2006.01) |
| ***A47B 97/04*** | (2006.01) |
| ***B43L 1/00*** | (2006.01) |
| ***B43L 1/06*** | (2006.01) |
| ***B43L 1/10*** | (2006.01) |
| ***G09B 11/00*** | (2006.01) |

(52) U.S. Cl.
CPC .............. *G09B 17/00* (2013.01); *A47B 97/04* (2013.01); *B43L 1/008* (2013.01); *B43L 1/06* (2013.01); *B43L 1/10* (2013.01); *G09B 11/00* (2013.01)

(58) Field of Classification Search
None
See application file for complete search history.

(56) References Cited

U.S. PATENT DOCUMENTS

| | | | | | |
|---|---|---|---|---|---|
| 458,852 | A * | 9/1891 | Larew | B43L 1/04 | 434/413 |
| 2,740,206 | A * | 4/1956 | Schatz | G09B 17/00 | 434/426 |
| 3,726,026 | A * | 4/1973 | Borcherding | G09B 1/08 | 434/430 |
| 4,127,948 | A * | 12/1978 | Goy Yu Chin | A63F 3/0423 | 434/416 |
| 5,409,383 | A * | 4/1995 | Mannino | B43L 1/00 | 434/408 |
| D444,176 | S * | 6/2001 | Leslie | D6/311 | |
| 9,483,958 | B1 * | 11/2016 | Feisthemel | G09B 1/08 | |
| 2007/0141546 | A1 * | 6/2007 | Kang | A63F 9/0641 | 434/408 |

* cited by examiner

*Primary Examiner* — James B Hull
(74) *Attorney, Agent, or Firm* — Matthew M. DiMaggio, Esq

(57) ABSTRACT

Embodiments of the disclosed technology are directed to devices, systems and/or apparatuses which form a learning system. Specifically, the disclosed technology is a versatile learning tool designed to facilitate educational activities. Its core component is a planar board equipped with a three-dimensional surface capable of securely holding various characters, such as letters, numbers, or mathematical symbols. Embedded behind the planar board may be a secondary writing board adapted to be stored and slid out from the backside of the planar board. The writing board may be adapted to be frictionally secured behind the planar board such that it is movable in a horizontal direction, but not in a vertical direction. One or both of the planar board and/or the writing board may have a stand for individually supporting one or both boards on a substantially flat surface.

17 Claims, 9 Drawing Sheets

FREESTANDING SENSORY LEARNING AND DISPLAY TOOL WITH INCORPORATED REUSABLE WRITING SURFACE

FIELD OF THE INVENTION

The present invention relates to children's learning tools, particularly to sensory toys for facilitating cognitive development while providing a reusable writing surface for honing a child's abilities.

BACKGROUND OF THE INVENTION

The history of wooden toys dates back centuries. Carpenters and artisans often created toys for their children, using scraps of wood. As society evolved, wooden toy making became a specialized craft, with intricate designs and detailed craftsmanship. These toys were often handmade and treasured as family heirlooms.

Wooden learning tools have endured as cherished companions for children across generations. Their enduring appeal lies in their simplicity, durability, and innate ability to foster learning and development. Crafted from natural materials, these toys offer a tactile experience that engages a child's senses, unlike their often plastic counterparts.

Beyond their nostalgic charm, wooden toys, and other simplified learning tools with easy-to-handle parts are invaluable educational tools. The smooth textures and weight of wood stimulate a child's sensory perception, while puzzles, shape sorters, and building blocks challenge their cognitive abilities. Fine motor skills are honed through manipulation of wooden toys, and their open-ended nature encourages boundless creativity and imagination. Furthermore, as wooden toys are often made from sustainable resources, they instill a sense of environmental responsibility.

In contemporary times, wooden toys have seamlessly integrated traditional values with modern aesthetics. Vibrant colors, engaging designs, and educational elements have been incorporated to captivate the attention of today's children. While the world of play has expanded to include digital and electronic options, wooden toys continue to hold a special place, offering a timeless and enriching play experience.

Wooden toys stand as a testament to the enduring power of simple, natural playthings. Their ability to nurture a child's cognitive, sensory, and creative development ensures their relevance in the modern world. As society increasingly seeks sustainable and enriching experiences for children, wooden toys offer a compelling and timeless choice.

Beyond their role as sources of entertainment, toys serve as invaluable tools in a child's development. Through play, children engage in a multifaceted learning process that encompasses cognitive, physical, social, and emotional growth.

Cognitive development is stimulated as children interact with toys that challenge their minds. Puzzles, blocks, and sorting games introduce concepts of shapes, colors, numbers, and patterns. Imaginative play, fostered by dolls, action figures, and play kitchens, ignites creativity, language development, and problem-solving skills.

Physical development is equally enhanced through play. Toys that encourage movement, such as balls, tricycles, and climbing equipment, help children develop gross motor skills. Fine motor skills and hand-eye coordination are refined through activities like building with blocks or stacking toys. Social and emotional growth is also nurtured through play.

Toys that facilitate sharing, cooperation, and turn-taking, such as playhouses, dolls, and toy cars, teach children essential social skills. Additionally, toys provide comfort and security, contributing to a child's emotional well-being. Sensory development is stimulated by toys with diverse textures, sounds, and colors. As children explore these sensory qualities, they expand their understanding of the world around them.

Hands-on sensory tools provide a rich and engaging approach to teaching children the alphabet. By stimulating multiple senses simultaneously, these tools create a multisensory learning environment that is both effective and enjoyable. As children manipulate objects like alphabet puzzles, play dough letters, or sandpaper letters, they develop essential fine motor skills that are crucial for handwriting and other tasks. Moreover, the process of exploring and interacting with these materials fosters cognitive development, strengthening problem-solving and critical thinking abilities.

Sensory activities are inherently captivating for young children, making learning the alphabet a fun and rewarding experience. This intrinsic motivation is essential for sustained engagement and learning. Additionally, hands-on tools cater to diverse learning styles, ensuring that all children can benefit from the learning process. Visual learners can explore colorful letter displays, kinesthetic learners can engage with tactile experiences, and auditory learners can benefit from tools that incorporate sounds.

By providing a strong foundation in letter recognition and formation, hands-on sensory tools prepare children for future reading success. The multi-sensory approach employed by these tools creates lasting memories and connections between letters, sounds, and meanings, ultimately enhancing a child's overall literacy development.

A blackboard or a chalkboard is a reusable writing surface on which text or drawings are made with sticks of calcium sulfate or calcium carbonate, known, when used for this purpose, as chalk. Blackboards were originally made of smooth, thin sheets of black or dark gray slate stone. Chalkboards have long been a staple in classrooms and public spaces, offering distinct advantages over traditional writing implements like crayons and markers. A dry erase board is similar to a chalkboard and incorporates several important characteristics of the chalkboard. A dry-erase board (also known by the terms marker board, whiteboard, dry-wipe board, and pen-board) is a glossy, usually white surface for making non-permanent markings. Whiteboards are analogous to blackboards, but with a smoother surface allowing for rapid marking and erasing of markings on their surface. The popularity of whiteboards increased rapidly in the mid-1990s and they have become a fixture in many offices, meeting rooms, school classrooms, public events and other work environments.

A cornerstone of blackboard and whiteboard utility lies in their re-usability. Unlike disposable counterparts such as markers and crayons, which necessitate constant replenishment, chalkboards offer a sustainable and cost-effective solution. A simple wipe clears the surface, preparing it for new information, a characteristic particularly valued in educational settings where content is frequently updated.

Moreover, the expansive writing area of a chalkboard is unparalleled. This generous space facilitates large-scale presentations, group brainstorming sessions, and clear visual demonstrations. In contrast, the confined dimensions of paper used with markers and crayons often restrict the scope of content. The visibility of chalkboard writing is another compelling attribute. In classrooms or auditoriums, information presented on a chalkboard is readily observable from various vantage points, ensuring optimal audience engagement.

Beyond their practical applications, chalkboards offer a unique sensory experience. The tactile act of writing with chalk engages multiple senses, enhancing cognitive and motor skill development. This kinesthetic element is often overlooked in the digital age, where interactions primarily occur through touchscreens. Additionally, chalkboards are versatile tools that transcend their basic function as writing surfaces. They can be transformed into dynamic visual aids through the incorporation of diagrams, graphs, and images, making them indispensable in various educational and professional contexts. While the allure of digital technology has introduced innovative methods of communication and instruction, the chalkboard remains an enduring symbol of effective learning and collaboration. Its combination of re usability, visibility, and tactile engagement positions it as a valuable tool that complements contemporary teaching and presentation methods.

Accordingly, it is desirable to combine a hands-on sensory learning toy with a reusable writing medium to facilitate children's learning and development.

SUMMARY OF THE INVENTION

Embodiments of the disclosed technology are directed to devices, systems and/or apparatuses which form a learning system. Specifically, the disclosed technology is a versatile learning tool designed to facilitate educational activities. Its core component is a planar board equipped with a three-dimensional surface capable of securely holding various characters, such as letters, numbers, or mathematical symbols.

The characters may be substantially flat and designed to fit snugly on the board's surface. Despite being flat, the characters may have some thickness sufficient to allow the characters to be set upright on a surface or the shelf. To provide storage of other components, the board is flanked by top and bottom flanges. The flanges serve as rails for a sliding component. This sliding element is a board with a flat writing surface, intended for activities like drawing or writing. To accommodate different usage scenarios, the writing surface may be made of various materials, including blackboard, whiteboard, and/or a magnetic surface.

The tool's adaptability is further enhanced by the inclusion of two stands. The first stand hinges from the back of the main board, allowing it to be positioned upright for display or storage. The second stand is attached to the sliding board and can be rotated to position the writing surface vertically, transforming the sliding board into its own free-standing easel.

To secure the characters to the main board, the disclosed technology may employ one or more methods, including magnets, hook-and-loop fasteners, or simple placement on shelves. This versatility ensures compatibility with various learning styles and preferences. Overall, this learning tool offers a comprehensive platform for educational activities, combining elements of a magnetic board, a dry-erase board, and an easel. Its modular design and adaptability make it suitable for teaching a wide range of subjects, from basic literacy and numeracy to more complex concepts.

In an embodiment of the disclosed technology, a versatile educational apparatus is disclosed which is formed of several interconnected components designed to facilitate a variety of learning activities. At its core is a primary structure, a generally flat surface or planar body, which serves as the foundation for the entire tool. This body is differentiated into two distinct sides: a front and a back.

The front side of the planar body is characterized by a three-dimensional surface, a unique feature that distinguishes it from a simple flat panel. This three-dimensional aspect is crucial to the tool's functionality as it is designed to accommodate a multiplicity of characters. These characters, in turn, are planar in shape and are specifically configured to be securely and removably positioned on the three-dimensional surface of the primary body. This arrangement suggests a system where characters can be attached, detached, and rearranged as needed, fostering interactive and exploratory learning.

The backside of the planar body is equipped with structural enhancements to support additional components and provide stability. Along the top and bottom edges of this side, there are protruding elements known as flanges. These flanges function as rails or tracks, providing a guided path for the movement of another component.

Attached to the upper region of the backside of the planar body is a hinged stand. This stand is designed to fold out or open, allowing the entire primary body to be positioned in a substantially upright position. This configuration transforms the tool into a freestanding display or learning station.

Complementary to the primary body is a secondary component, a board characterized by its flat, planar shape. This board is designed to interact with the primary body through the flanges on its backside. It can be inserted between the top and bottom flanges of the primary body and moved horizontally along these tracks. The surface of this board, exposed to the user, is described as a reusable writing surface, indicating that it is designed to accommodate various writing or drawing materials and can be cleaned for repeated use.

To enhance the versatility of the tool, a second stand is attached to the back surface of the sliding board. This stand is designed to rotate, enabling the board to be positioned vertically. When combined with the writing surface, this configuration transforms the tool into a makeshift easel, allowing for vertical display or use.

In essence, this invention presents a modular and adaptable learning tool that combines elements of a character display board, a writing surface, and a stand. Its design facilitates a range of educational activities, from character recognition and manipulation to writing and drawing. The integration of multiple components and their ability to be configured in different ways contributes to the tool's overall functionality and potential for diverse applications.

The foundational learning tool described previously can be adapted and enhanced in numerous ways to cater to specific educational needs and preferences. One embodiment, for example, relates to the nature of the characters accommodated by the board. Primarily designed as a versatile platform, the utility of the disclosed technology can be specialized by focusing on particular character sets. For example, the plurality of characters can be exclusively composed of the letters of the alphabet, transforming the tool into a dedicated alphabet learning apparatus. This configuration would be particularly beneficial for early childhood education, where letter recognition and formation are fundamental skills.

Alternatively, the character set can be numerical, encompassing digits from zero to nine. In this form, the learning tool becomes a numerical learning aid, supporting the development of number sense and mathematical concepts.

To optimize the organization and accessibility of the characters, the front side of the planar body can be equipped with one or more horizontal shelves. These shelves provide designated spaces for character placement, promoting tidiness and facilitating character selection. This feature is particularly useful when dealing with a large number of characters.

The functionality of the learning tool can be further expanded by varying the material of the writing surface. Traditionally, chalkboards have been widely used in educational settings. By incorporating a blackboard as the writing surface, the tool can be utilized for traditional chalk-based instruction and practice.

Conversely, a whiteboard offers a contemporary alternative, providing a smooth, erasable surface suitable for markers or dry-erase pens. To ensure the durability and structural integrity of the tool, the top and bottom flanges can be constructed using rabbet joints. This woodworking technique creates interlocking joints, enhancing the strength and stability of the overall structure.

Expanding on the character types, the tool can be designed to accommodate both numbers and mathematical symbols, making it a comprehensive tool for early mathematics education. This configuration would support the teaching of basic arithmetic operations, geometric shapes, and algebraic concepts.

To facilitate character manipulation and organization, various attachment mechanisms can be employed. One option involves incorporating magnets into both the characters and the front surface of the planar body. This magnetic system allows for easy placement, removal, and rearrangement of characters. Alternatively, hook and loop fasteners, commonly known as Velcro, can be utilized. This method offers a secure and versatile attachment system, enabling various configurations and combinations of characters. In still further embodiments, the disclosed learning tool can be customized and enhanced through a variety of modifications, expanding its capabilities and adaptability to diverse educational requirements. By carefully selecting character sets, writing surfaces, attachment mechanisms, and structural elements, the tool can be tailored to specific learning objectives, making it a valuable asset in educational environments.

In further embodiments of the disclosed technology, a system is provided which encompasses several modular elements. The system is a versatile learning apparatus, formed of several interconnected components designed to facilitate a wide range of educational activities. At its core is a primary planar board having a substantially flat surface designed to serve as the foundation for the entire system.

A distinctive feature of this primary board is the incorporation of multiple horizontal shelves on its front face. These shelves provide a structured platform for the placement of other components. The backside of the board is equipped with a pair of specialized slots, known as rabbet joint slots. These slots have a specific configuration, resembling a J-shape when viewed from the bottom and an inverted J-shape when viewed from the top. This unique design is crucial for the integration of additional components.

To enhance the educational potential of the tool, a set of alpha-numeric characters is included. These characters are primarily flat in shape with a uniform thickness, allowing them to stand upright when placed on the shelves of the primary board. This arrangement promotes character recognition, manipulation, and sequencing.

To provide stability and versatility, the primary board is equipped with a hinged stand attached to its upper edge. This stand can be adjusted to multiple positions, enabling the board to be tilted or positioned upright as needed.

A secondary component is a planar board, characterized by its flat surface and relatively thin profile. This board is designed to slide horizontally within the rabbet joint slots of the primary board. The fit between the board and the slots is precise, ensuring a secure and stable connection while allowing for smooth movement.

One side of the secondary board is designated as a reusable writing surface, providing a space for drawing, writing, or other creative activities. Similar to the primary board, the secondary board is equipped with a hinged stand. This stand, independent from the first, allows the secondary board to be positioned vertically, transforming the entire apparatus into an easel-like configuration.

The system is a highly adaptable learning tool that combines elements of a character board, a writing surface, and multiple stands. The integration of multiple components and the ability to configure these components in various ways contribute to the tool's versatility and effectiveness in supporting diverse educational objectives.

In further embodiments of the disclosed system, the writing surface of the first planar board may be configured as a blackboard. This configuration allows for traditional chalk-based writing and erasing, providing a familiar and tactile user experience.

Alternatively, the writing surface can be implemented as a whiteboard. This embodiment offers advantages such as erasability with a dry-erase marker, reduced mess compared to chalk, and potentially greater visibility.

The system may be further defined by the specific set of alpha-numeric characters employed. In one aspect, the plurality of alpha-numeric characters encompasses the complete English alphabet. This configuration is particularly suitable for educational applications, where a comprehensive character set is essential.

In another embodiment, the character set is focused on numbers and mathematical symbols. This variation caters to applications requiring numerical and mathematical expression, such as scientific or engineering contexts.

The manner in which the alpha-numeric characters are attached to the first planar board constitutes another dimension of variation within the claimed system. One approach involves equipping each character with one or more magnets. Corresponding magnets are affixed to the front surface of the first planar board. This magnetic attachment mechanism provides a convenient and secure means of attaching and detaching characters.

As an alternative, the characters can be furnished with one or more strips of hook and loop fasteners. Complementary hook and loop fasteners are applied to the front surface of the first planar board. This attachment method offers a reliable and versatile means of securing the characters to the writing surface. These embodiments represent a non-exhaustive list of potential variations within the scope of the above-described embodiment. It is to be understood that the invention is not limited to the specific implementations described herein, but encompasses a broader range of configurations and adaptations.

A better understanding of the disclosed technology will be obtained from the following brief description of drawings illustrating exemplary embodiments of the disclosed technology.

A better understanding of the disclosed technology will be obtained from the following detailed description of embodiments of the disclosed technology, taken in conjunction with the drawings.

DETAILED DESCRIPTION

References will now be made in detail to the present exemplary embodiments, examples of which are illustrated in the accompanying drawings. Certain examples are shown in the above-identified figures and described in detail below. In describing these examples, like or identical reference numbers are used to identify common or similar elements. The figures are not necessarily to scale and certain features and certain views of the figures may be shown exaggerated in scale or in schematic for clarity and/or conciseness.

Referring now to the figures, devices and systems are provided for a freestanding, educational display tool. The device is composed of three primary components: a main frame, a chalkboard panel, and a freestanding support structure. The main element is a rectangular structure with a flat back and four sides, forming a box-like enclosure. The front face of this planar body is divided into horizontal rows, each containing a set of alpha-numeric characters. Attached to the bottom of the main planar board is a freestanding support structure. This component may be composed of two angled legs connected at their apex to a horizontal bar which is attached to the main frame. This structure provides stability to the device when placed on a flat surface. A reusable writing panel may be slidably disposed and contained along a back side of the planar body. The reusable writing panel may be held in place using a set of two opposing grooves on the back side of the planar body. The reusable writing panel may likewise have one or more legs for standing the reusable writing panel upright by itself, exclusive of the main planar body.

Figure 1:
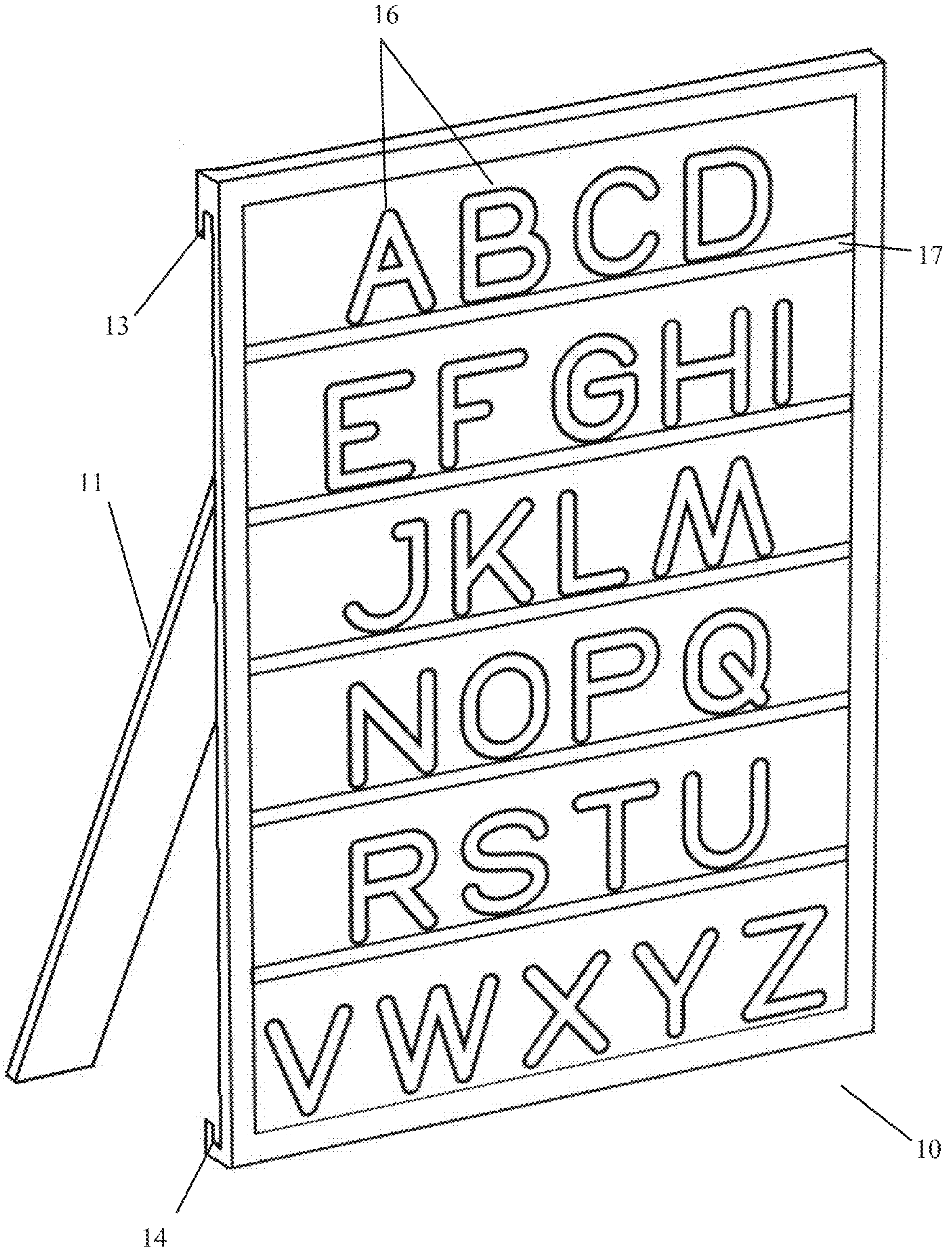
FIG. 1 shows a perspective view of an educational play system in accordance with embodiments of the present invention.

Referring now to FIG. 1, a perspective view a shown of an educational play system in accordance with embodiments of the present invention. Its core component is a planar board 10 equipped with a three-dimensional surface capable of securely holding various characters 16, such as letters, numbers, or mathematical symbols. The letters are depicted to be arranged in alphabetical order, with each letter positioned on a horizontal shelf 17 within the frame 10. The letters 16 may be made of a variety of materials, such as plastic, wood, and/or metal. The frame 10 may be constructed of wood, metal, plastic and/or a variety of other materials known in the art of toys and educational tools.

Within this specification, references may be made to the spatial relationships between components and the spatial orientation of various aspects of these components as depicted in the accompanying drawings. However, it is essential to recognize that the devices, members, apparatuses, etc., described herein can be positioned in any desired orientation. Therefore, the use of terms to describe spatial relationships or orientations should be interpreted as relative descriptions, acknowledging that the device can be oriented in any direction. Generally, with respect to this specification and any disclosed embodiments of the educational play system, "top" or "upper" generally refers to the region of the planar board closest to the attached hinge point. Moreover, "bottom" or "lower" generally refers to the base region of the container, onto which, for example, the system may be set on a flat surface.

The frame may include a foldable easel or stand 11 for supporting the board 10 in an upright position. The board 10 is designed to teach the alphabet, letter recognition, and basic phonics. It may be used in educational settings, such as schools or homes, to assist in early childhood development.

The characters 16 may be substantially flat and designed to fit snugly on the board's surface. To provide stability, the board is flanked by a top flange 13 and a bottom flange 14, which serve as rails for a sliding component. This sliding element is a board with a flat writing surface, intended for activities like drawing or writing. To accommodate different usage scenarios, the writing surface can be made of various materials, including blackboard or whiteboard. The sliding element will be described in further detail with respect to FIGS. 3 through 10.

Figure 2:
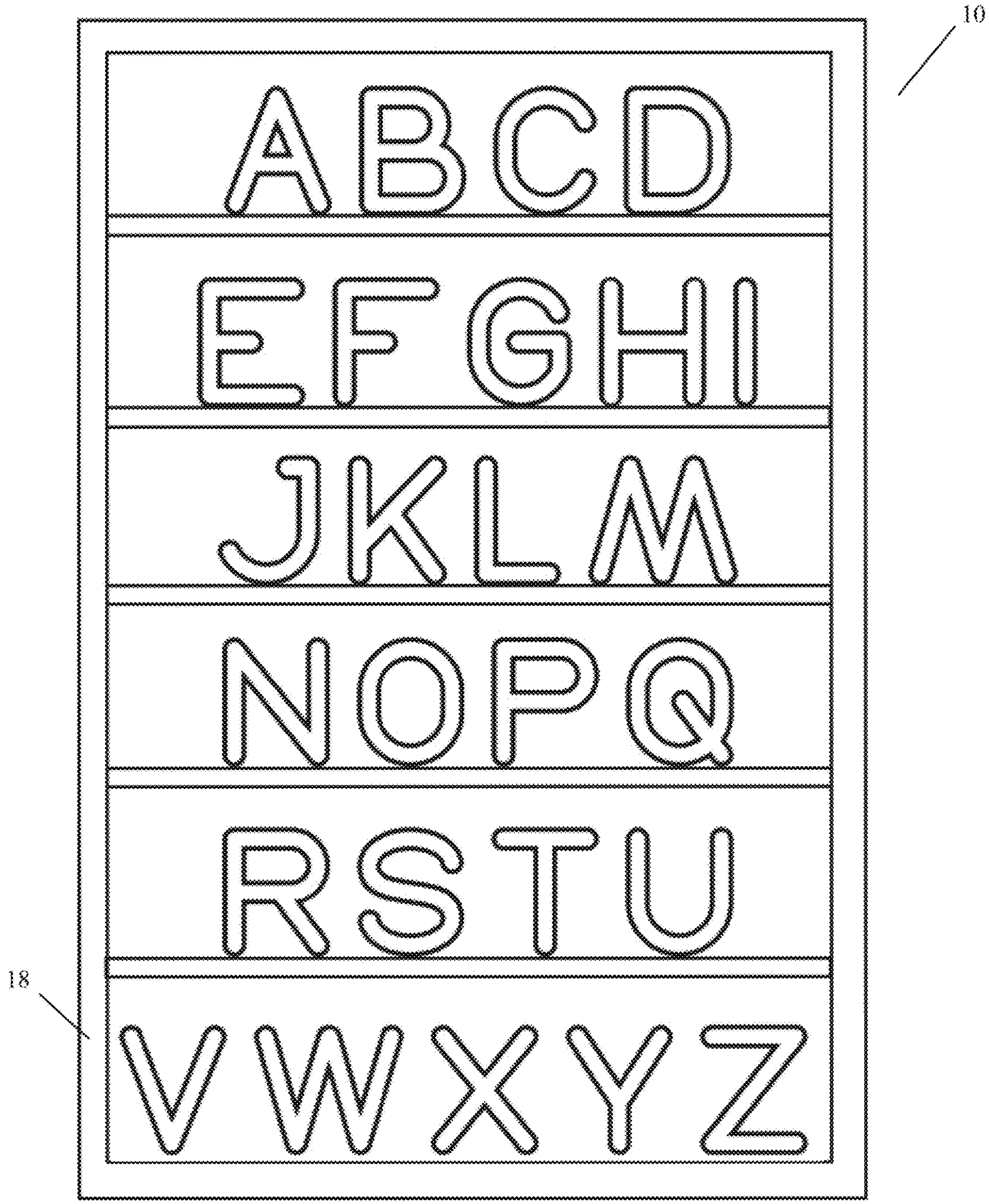
FIG. 2 shows a front elevation view of an educational play system in accordance with embodiments of the present invention.

FIG. 2 shows a front elevation view of an educational play system in accordance with embodiments of the present invention. The main component, the planar board 10, may also, for purposes of this specification, be referred to as a "frame 10", "board 10", "planar board 10", "learning tool 10", "primary board 10" and/or "tool 10". In the embodiment shown in FIG. 1, the planar body 10 is more akin to a frame in that it has four edges which form a rectangular frame around the exterior, front side thereof. As such, the planar body 10 has a framed edge 18. The framed edge 18 has a top edge, a bottom edge and side edges. Accordingly, in this embodiment, the front surface of the primary board 10 is substantially three-dimensional. That is, the front surface has a framed edge 18 and shelves 17 which extend from a substantially flat board to form a plurality of recessed areas for receiving characters 16. The recessed areas are generally formed of and defined by the shelves. The recessed areas may be adapted to receive and store characters 16.

To secure the characters 16 to the main board 10, several methods are envisioned, including magnets, hook-and-loop fasteners, or simple gravitational placement on shelves 17. This versatility ensures compatibility with various learning styles and preferences. As such, for example, in other embodiments, the shelves 17 may be used to practice spelling, mathematics, counting, shape recognition, and any other early learning subjects.

As described, the front side of the planar body 10 is characterized by a three-dimensional surface, a unique feature that distinguishes it from a simple flat panel. This three-dimensional aspect is crucial to the tool's functionality as it is designed to accommodate a multiplicity of characters. These characters 16, in turn, are planar in shape, and are substantially flat, having a thickness which allows them to stand and balance on their own. The characters 16 and are specifically configured to be securely and removably positioned on the three-dimensional surface of the primary body 10. This arrangement facilitates a system where characters 16 can be attached, detached, and rearranged as needed, fostering interactive and exploratory learning.

Alternatively, the character set can be numerical, encompassing digits from zero to nine. In this form, the learning tool becomes a numerical learning aid, supporting the development of number sense and mathematical concepts.

To optimize the organization and accessibility of the characters 16, the front side of the planar body 10 may be equipped with the one or more horizontal shelves 17. These shelves 17 provide designated spaces for character placement, promoting tidiness and facilitating character selection. This feature is particularly useful when dealing with a large number of characters 16.

Expanding on the character types, the tool can be designed to accommodate both numbers and mathematical symbols, making it a comprehensive tool for early mathematics education. This configuration would support the teaching of basic arithmetic operations, geometric shapes, and algebraic concepts.

To facilitate character manipulation and organization, various attachment mechanisms may be employed. One option involves incorporating magnets into both the characters 16 and the front surface of the planar body 10. This magnetic system allows for easy placement, removal, and rearrangement of characters 16. Alternatively, hook and loop fasteners, commonly known as Velcro, can be utilized. This method offers a secure and versatile attachment system, enabling various configurations and combinations of characters 16.

In still further embodiments, the disclosed learning tool 10 can be customized and enhanced through a variety of modifications, expanding its capabilities and adaptability to diverse educational requirements. By carefully selecting character sets, writing surfaces, attachment mechanisms, and structural elements, the tool can be tailored to specific learning objectives, making it a valuable asset in educational environments.

Figure 3:
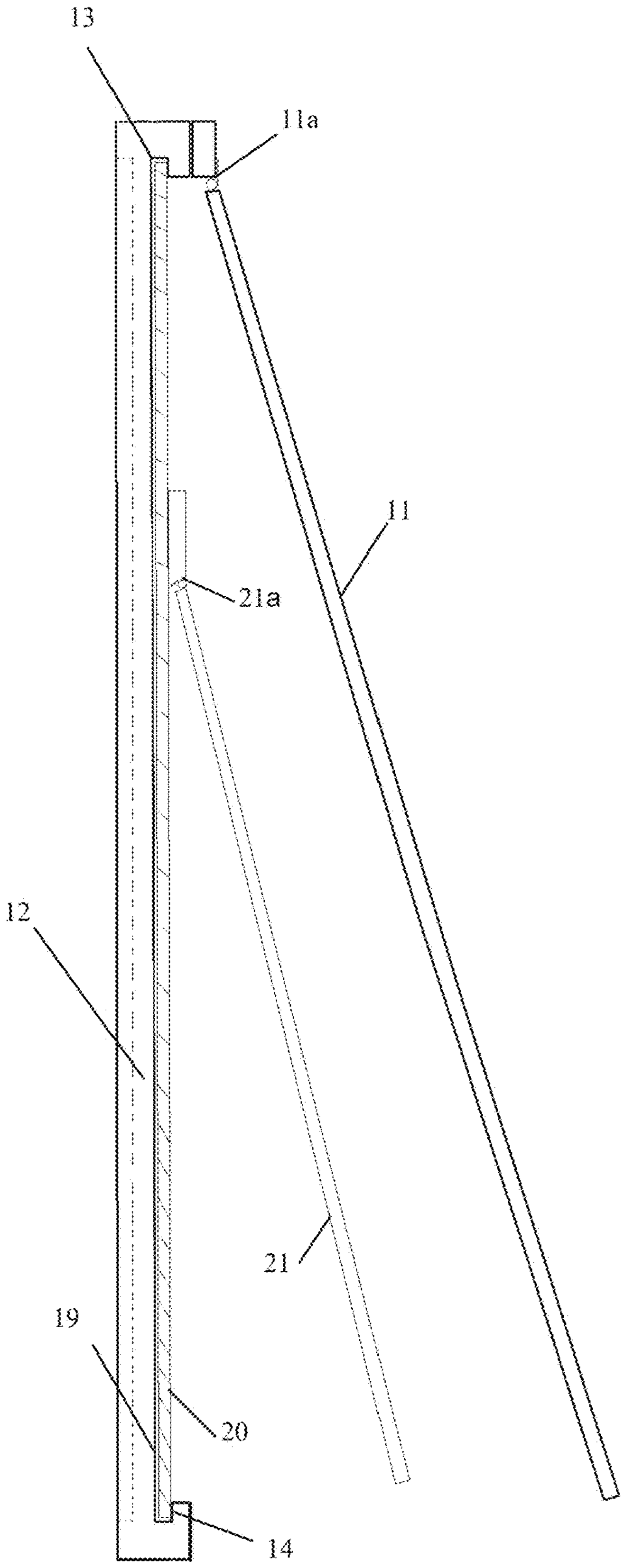
FIG. 3 shows a side elevation view of the an educational play system in accordance with embodiments of the present invention.
Figure 4:
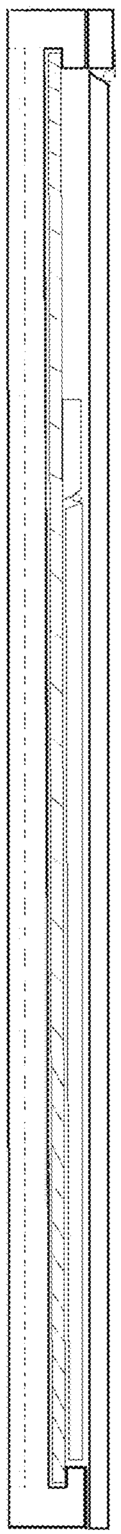
FIG. 4 shows the same side cross elevation view as FIG. 3 with the stands extended in accordance with embodiments of the present invention.

FIG. 3 shows a side elevation view of the an educational play system in accordance with embodiments of the present invention. FIG. 4 shows the same side cross elevation view as FIG. 3 with the stands extended in accordance with embodiments of the present invention. The tool's adaptability is further enhanced by the inclusion of two stands 11, 21. The first stand 11 hinges from the back of the main board 19, allowing it to be positioned upright for display or storage. The second stand 21 is attached to the sliding board 20 and can be rotated to position the writing surface vertically, transforming the board into a standing easel. The first stand 11 is attached via a hinge 11*a* near the top edge of the backside 19 of the board 10. The second stand 21 is attached via a hinge 21*a* at a point on the back surface of the sliding board 20. The side edge 12 of the frame 10 may substantially uniform in shape, having a substantially rectangular cross section with the exception of the flanges or slots 13, 14 disposed at the top and bottom edges of the frame.

To elaborate, the backside 19 of the board 10 is equipped with a pair of specialized slots 13 14, which may be known in the art of woodworking as rabbet joint slots. These slots have a specific configuration, the bottom 14 forming a J-shape when viewed from the side. Whereas the top 13 may resemble an inverted J-shape when viewed from the side (such as is shown in FIGS. 3 and 4). This unique design is crucial for the integration of additional components which will be described below.

A secondary component is a planar board 20, characterized by its flat surface and relatively thin profile. This board 20 is designed to slide horizontally within the rabbet joint slots 13, 14 of the primary board 10. The fit between the board 10 and the slots 13, 14 is precise, ensuring a secure and stable connection while allowing for smooth movement.

Figure 5:
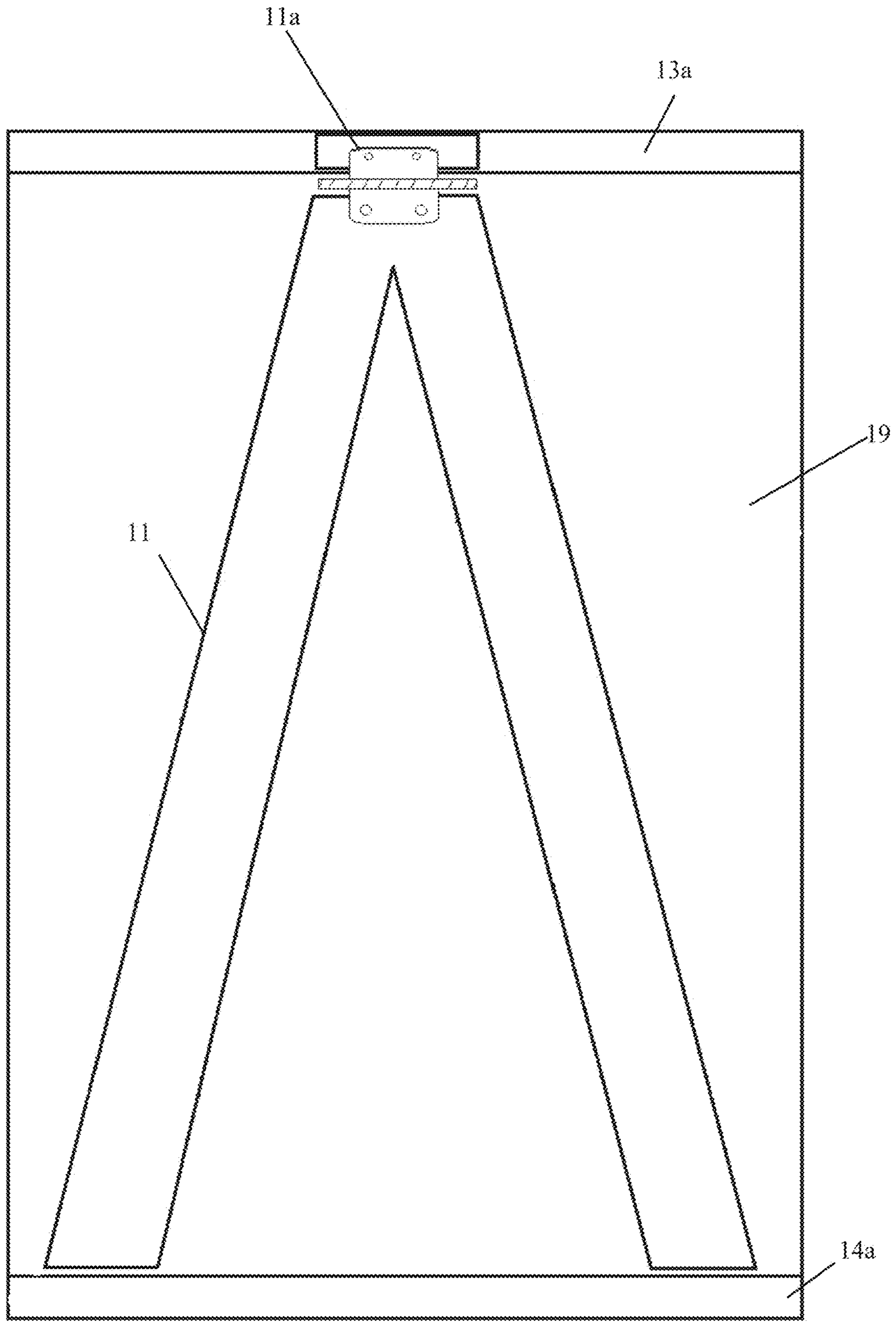
FIG. 5 shows a rear elevation view of the main planar body of an educational play system in accordance with embodiments of the present invention.

FIG. 5 shows a rear elevation view of the main planar body of an educational play system in accordance with embodiments of the present invention. To provide stability and versatility, the primary board 10 may be equipped with a hinged stand 11 attached substantially near its upper edge. This stand can be adjusted to multiple positions, enabling the board to be tilted or positioned upright as needed. Also depicted is the top rear edge 13*a* and the bottom rear edge 14*a* of the backside 19 of the board 10. It should be noted that, in this specific view, the sliding board is not shown.

Figure 6:
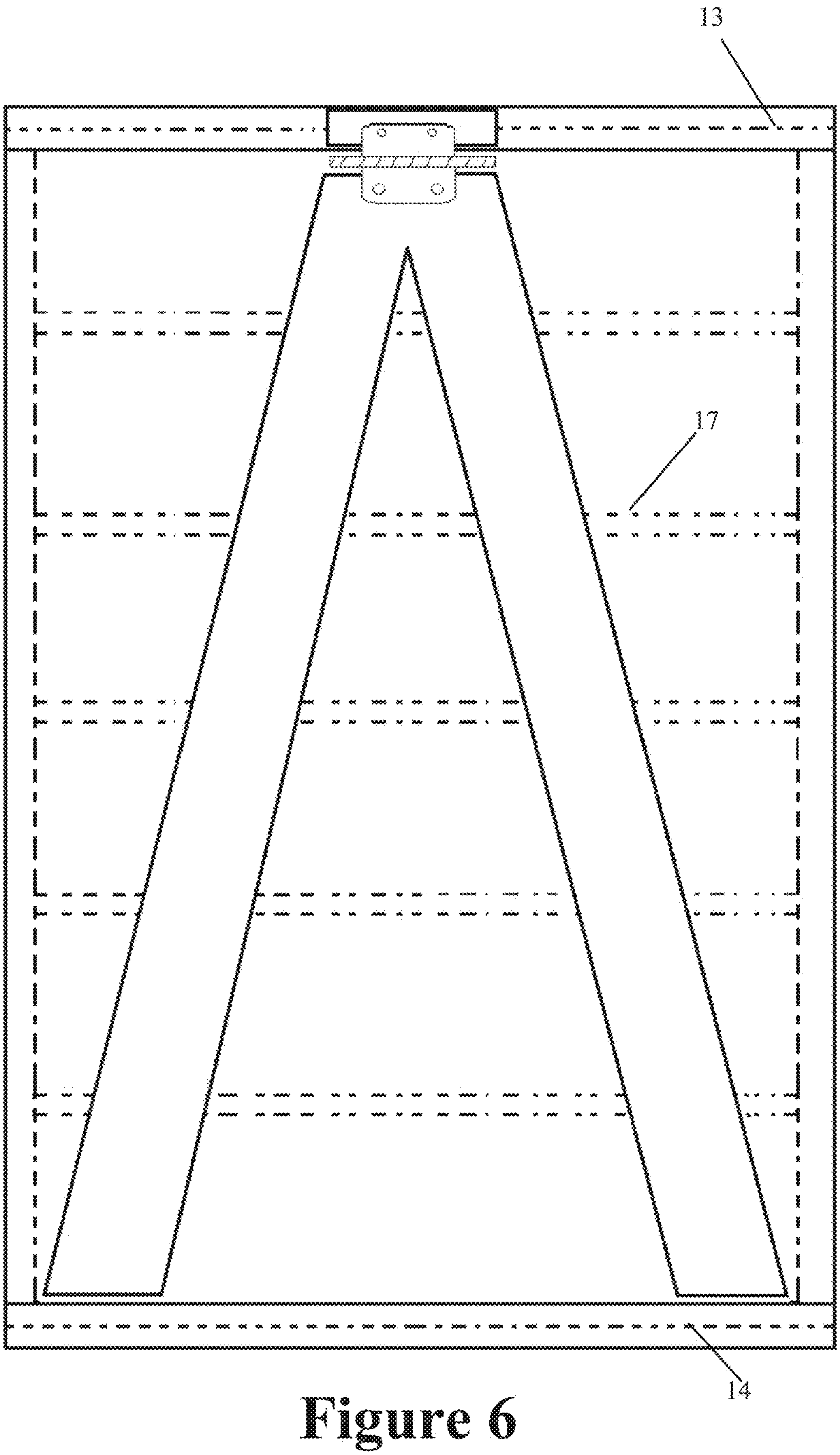
FIG. 6 shows a rear elevation schematic with outlines of an educational play system in accordance with embodiments of the present invention.

FIG. 6 shows a rear elevation schematic with outlines of an educational play system in accordance with embodiments of the present invention. From this schematic, the arrangement of the shelves 17 as well as the rabbet joint slots 13, 14 becomes apparent.

Figure 7:
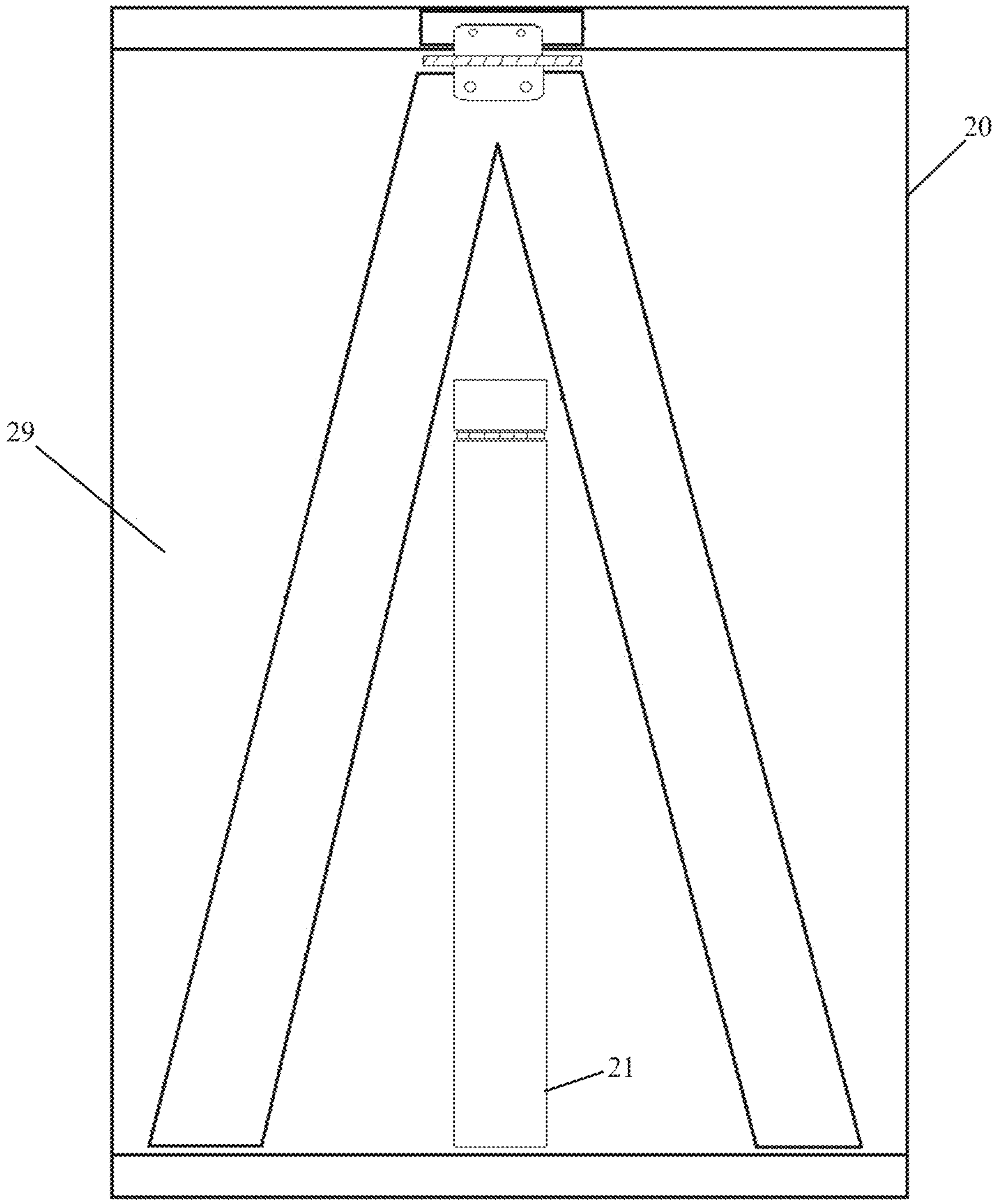
FIG. 7 shows a rear elevation view of the entire educational play system in accordance with embodiments of the present invention

FIG. 7 shows a rear elevation view of the entire educational play system in accordance with embodiments of the present invention. In this view, unlike in FIGS. 5 and 6, the sliding board 20 a.k.a. the secondary component is depicted. The secondary component, as alluded to, may be a planar board, characterized by a flat surface and relatively thin profile. The sliding board 20 is designed to slide horizontally within the rabbet joint slots 13, 14 of the primary board 10. The fit between the board and the slots is precise, ensuring a secure and stable connection while allowing for smooth movement.

The backside 29 of the secondary board 20 may have a second stand 21. The second stand 21 may be adapted to stand the secondary board 20 in a substantially upright position. The second stand 21 may, in further embodiments, be used to stand the entire assembly upright, including the main board 10 and the secondary board 10, thus eliminating the need for a first stand 11.

Figure 8:
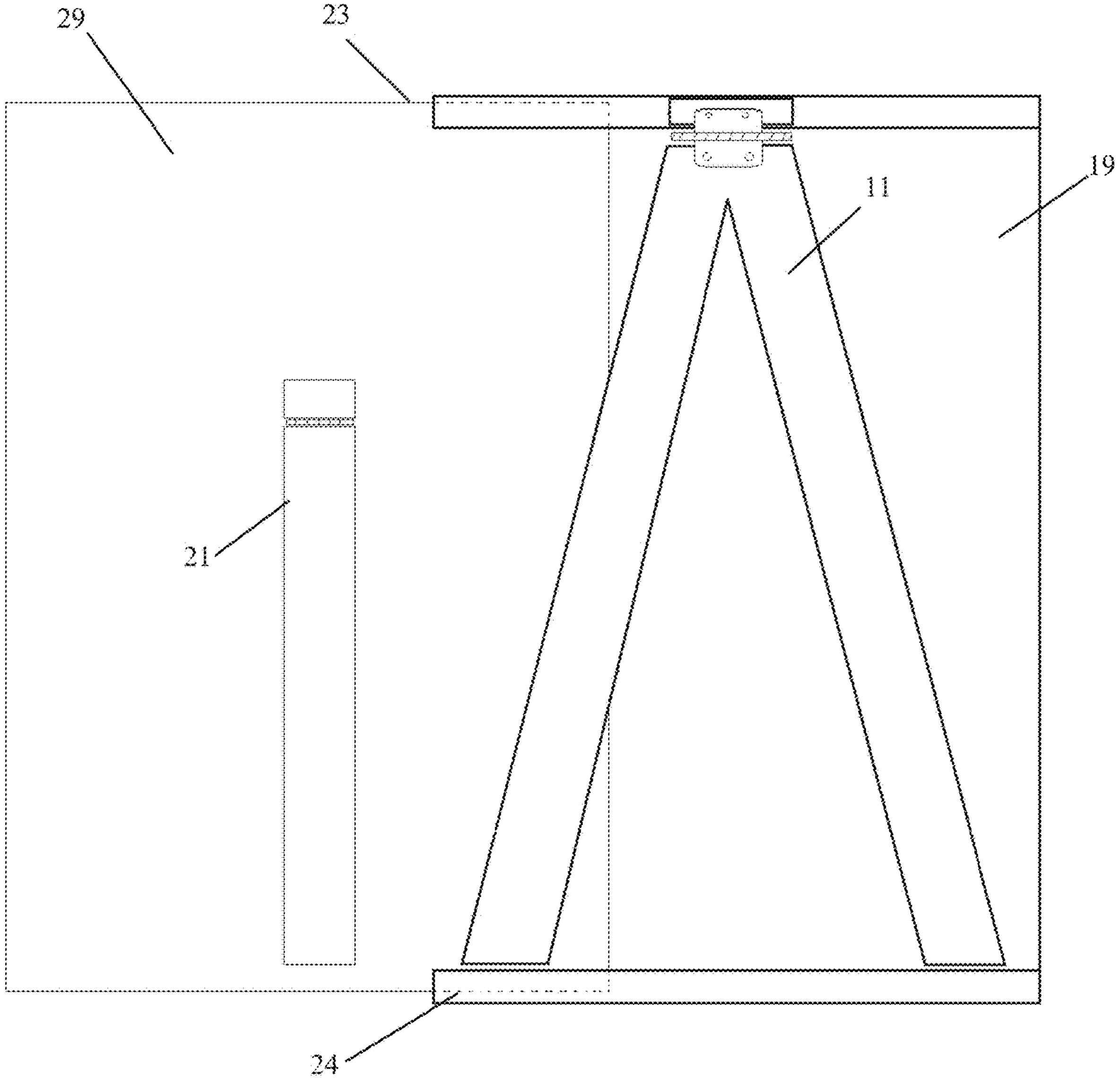
FIG. 8 shows a rear elevation view of the entire educational play system with the reusable writing panel slidably extended in accordance with embodiments of the present invention.
Figure 9:
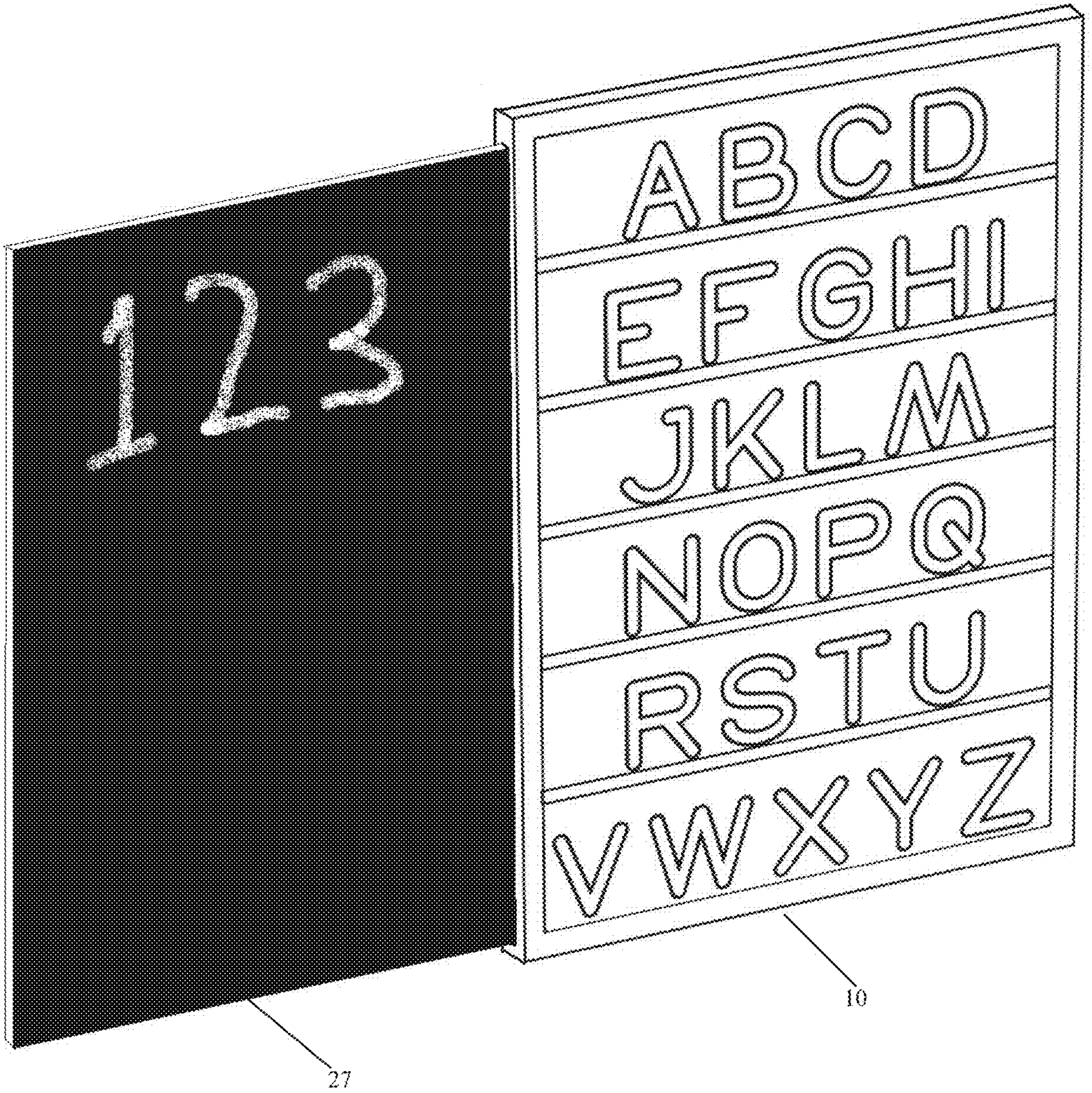
FIG. 9 shows a front perspective view of the entire educational play system with the reusable writing panel slidably extended in accordance with embodiments of the present invention.

FIG. 8 shows a rear elevation view of the entire educational play system with the reusable writing panel slidably extended in accordance with embodiments of the present invention. FIG. 9 shows a front perspective view of the entire educational play system with the reusable writing panel slidably extended in accordance with embodiments of the present invention. One side of the secondary board 20 may be designated as a reusable writing surface 27, providing a space for drawing, writing, or other creative activities.

Similar to the primary board 10, the secondary board 20 may be equipped with a hinged stand 21. This stand 21, independent from the first 11, allows the secondary board 20 to be positioned vertically, transforming the entire apparatus into an easel-like apparatus.

The system is a highly adaptable learning tool that combines elements of a character board, a writing surface 27, and multiple stands 11, 21. The integration of multiple components and the ability to configure these components in various ways contribute to the tool's versatility and effectiveness in supporting diverse educational objectives. For example, the writing surface 27 can be implemented as a whiteboard. This embodiment offers advantages such as erasability with a dry-erase marker, reduced mess compared to chalk, and potentially greater visibility.

In further embodiments of the disclosed system, the writing surface 27 of the sliding planar board 20 may be configured as a blackboard. This configuration allows for traditional chalk-based writing and erasing, providing a familiar and tactile user experience.

The system may be further defined by the specific set of alpha-numeric characters employed. In one aspect, the plurality of alpha-numeric characters encompasses the complete English alphabet. This configuration is particularly suitable for educational applications, where a comprehensive character set is essential.

In another embodiment, the character set is focused on numbers and mathematical symbols. This variation caters to applications requiring numerical and mathematical expression, such as scientific or engineering contexts.

The manner in which the alpha-numeric characters 16 are attached to the first planar board constitutes another dimension of variation within the claimed system. One approach involves equipping each character with one or more magnets. Corresponding magnets are affixed to the front surface of the first planar board. This magnetic attachment mechanism provides a convenient and secure means of attaching and detaching characters.

Figure 10:
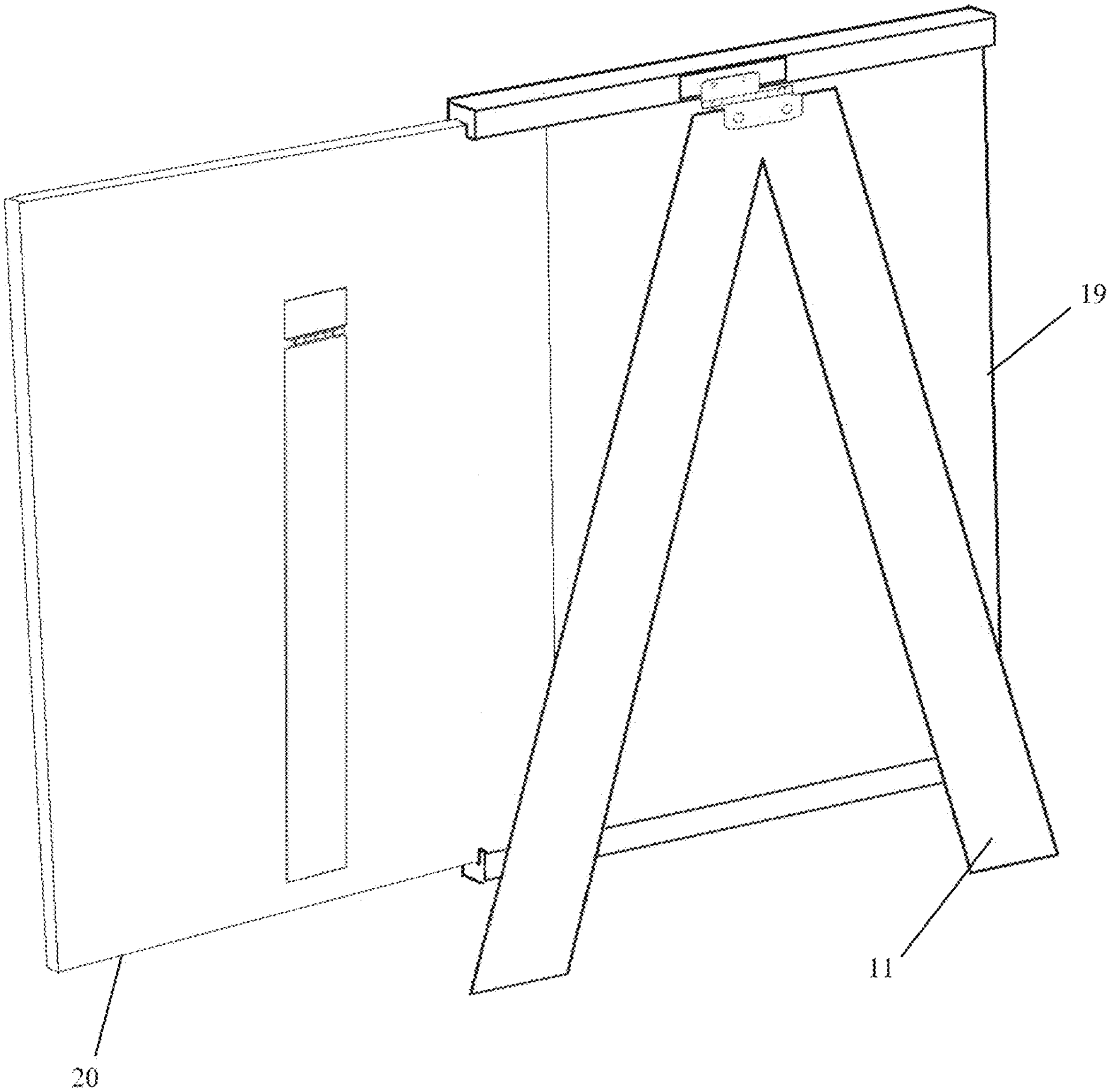
FIG. 10 shows a rear perspective view of the entire educational play system with the reusable writing panel slidably extended in accordance with embodiments of the present invention.

As an alternative, the characters 16 can be furnished with one or more strips of hook and loop fasteners. Complementary hook and loop fasteners are applied to the front surface of the first planar board. This attachment method offers a reliable and versatile means of securing the characters to the writing surface. These embodiments represent a non-exhaustive list of potential variations within the scope of the above-described embodiment. It is to be understood that the invention is not limited to the specific implementations described herein, but encompasses a broader range of configurations and adaptations FIG. 10 shows a rear perspective view of the entire educational play system with the reusable writing panel slidably extended in accordance with embodiments of the present invention. The sliding panel 20 is depicted to be slidable out from behind the back 19 of the frame 10. In embodiments, the stand 11 may be sturdy enough such that the sliding panel 20 may be partially slid out and held in place while the stand 11 supports the entire assembly when place on a surface. In this configuration, the stand 11 may be sturdy enough that the writing surface 27 may be written on in this position. As such, it is envision that a user may refer to the characters 16 while writing on the writing surface 27.

One or more of the components of the frame 10, the sliding panel 20, the stands 11, 21, the characters 16 and any of other components may be composed of one or more of the following materials: wood, plastic, cardboard, paper, polymer, thermoplastic, polymer, rubber, elastomer, polyethylene terephthalate (PET), amorphous polyethylene terephthalate (APET), oriented polyethylene terephthalate (OPET), metalized polyethylene terephthalate (MET-PET), polyethylene (PE), low density polyethylene (LDPE), linear low density polyethylene (LLDPE), metalocene linear low density polyethylene (mLLDPE), high density polyethylene (HDPE), metalocene polyethylene (mPE), ethylene vinyl acetate (EVA), polypropylene (PP), metalized oriented polypropylene (mOPP), polystyrene (PS), high impact polystyrene (HIPS), foil, ethylene vinyl alcohol (EVOH), polyamide, Nylon, polyvinyl chloride (PVC) and/or any other material known in the art of toy manufacturing and/or learning implimentations.

Overall, this learning tool offers a comprehensive platform for educational activities, combining elements of a magnetic board, a dry-erase board, and an easel. Its modular design and adaptability make it suitable for teaching a wide range of subjects, from basic literacy and numeracy to more complex concepts.

In a hypothetical method of using the above-described learning tool, a user may begin by receiving the boards components and attaching, if necessary, the stands to the rear surfaces of each of the frame and the sliding panel. Next, frame may be placed on a stable, flat surface. Then the secondary writing board may be securely positioned behind the planar board by sliding the secondary writing board in between the slots provided on the backside of the frame. Next, a user should gather the appropriate characters (letters, numbers, symbols) for the intended educational activity. As such, a visual representation may be created on the front side of the frame. The desired characters may be arranged on the three-dimensional surface of the planar board to illustrate words, equations, or other educational concepts. When desirous of using the In embodiments, a user may experiment with different layouts to stimulate critical thinking and creativity. For educational purposes, the meaning or purpose of the arrangement should be explained using precise and age-appropriate language. It should be ensured that the explanations are clear, concise, and aligned with the learner's understanding level. The educator and learner are encouraged to interact with the visual aid through tactile exploration, pointing, or manipulation of characters (if appropriate). Thoughtful activities should be employed to stimulate curiosity, critical thinking, and a deeper understanding. The secondary writing board should be utilized to reinforce learning by tracing, writing, or drawing corresponding letters, numbers, or symbols. The learning tool should be used for regular practice and should facilitate positive feedback to build confidence. As the learner progresses, more complex concepts should be introduced and the activities adjusted to meet their individual needs and learning styles. It is contemplated that games, puzzles, or real-world examples may be implemented to enhance engagement and relevance.

One skilled in the art will recognize that an implementation of an actual apparatus or method may contain other components as well. While it is obvious that modification or proper change and combination can be made to the present learning tool according to the present invention by those skilled in the art, however, without departing from the contents, spirit and scope of the invention, any variations that are intended to achieve the techniques disclosed in the present invention should be within the scope of this invention. Specifically, it should be pointed out that all similar substitutions and modifications are obvious to those skilled in the art, and they are deemed to be within the scope and content of the present invention.

It is to be understood that the foregoing detailed description and accompanying drawings relate to a preferred illustrative embodiment of the invention. However, various changes and modifications may be made without departing from the spirit and scope of the invention.

Accordingly, the present invention is not limited to the specific arrangements as shown in the drawings and described in detail herein above. The exemplary materials, constructions and illustrations included in the preferred embodiment and this patent application should therefore not be construed to limit the scope of the present invention, which is defined by the appended claims.

While the disclosed invention has been taught with specific reference to the above embodiments, a person having ordinary skill in the art will recognize that changes may be made in form and detail without departing from the spirit and the scope of the invention. The described embodiments are to be considered in all respects only as illustrative and not restrictive. All changes that come within the meaning and range of equivalency of the claims are to be embraced within their scope. Combinations of any of the methods, apparatuses, and devices described hereinabove are also contemplated and within the scope of the invention.

The invention claimed is:

1. A learning tool, the learning tool comprising:

a generally planar body having a front and a back side wherein the front side of the planar body has a three-dimensional surface adapted to releasably receive a plurality of characters, further wherein each of the characters of the plurality of characters is generally planar and shaped to be releasably arranged on the front side of the planar body, further wherein the back side of the planar body has a top flange along a top edge of the back side and a bottom flange along a bottom edge of the back side;

a first stand hingedly attached at an upper region of the back side of the planar body, the stand adapted to be hingedly opened such that the planar body is stood substantially upright;

a board with a substantially planar shape having a substantially flat front surface and back surface, wherein the board is adapted to be slidably received between the top and bottom flanges of the planar body in a horizontal direction, further wherein the front surface of the board is a reusable writing surface; and a second stand hingedly affixed to the back surface of the board, the stand adapted to extend rotationally to orient the board in a substantially vertical position.

2. The learning tool of claim 1, wherein the plurality of characters forms each of the letters of the alphabet.

3. The learning tool of claim 1, wherein the plurality of characters forms numbers from zero to nine.

4. The learning tool of claim 1, wherein front side of the planar body has one or more horizontal shelves adapted to receive the plurality of characters.

5. The learning tool of claim 1, wherein writing surface is a blackboard.

6. The learning tool of claim 1, wherein the writing surface is a whiteboard.

7. The learning tool of claim 1, wherein the top and bottom flanges are rabbet joints.

8. The learning tool of claim 1, wherein the plurality of characters is numbers and mathematics symbols.

9. The learning tool of claim 1, wherein each of the characters of the plurality of characters has one or more magnets which correspond to and attach to corresponding magnets attached to the front surface of the first planar board.

10. The learning tool of claim 1, wherein each of the characters of the plurality characters has one or more strips of hook & loop fasteners which correspond to and attach to corresponding hook & loop fasteners affixed to the front surface of the first planar board.

11. A system, comprising:

a first planar board having a plurality of horizontal shelves on a front surface thereof and two rabbet joint slots on a back surface thereof, the rabbet joint slots forming a J-shaped cross section along a bottom edge of the back surface and an upside-down J-shaped cross section along a top edge of the back surface;

a plurality of alpha-numeric characters, each character being formed of a substantially planar body with a slight uniform thickness, wherein each character is adapted to be received and stood vertically on the plurality of horizontal shelves; and a first stand extending substantially downwards from the top edge of the back surface of the first planar board, the stand being attached along the top edge of the back surface by a hinge, the hinge adapted to toggle the stand between two or more different angular positions with respect to the back surface of the first planar board;

a second planar board having a reusable writing surface on a first surface thereof, the second planar board being substantially flat having a slight thickness, wherein the second planar board is slidably received in a horizontal direction between the top and bottom rabbet joint slots of the first planar board, the slight thickness being slightly smaller than the rabbet joint slots such that the second planar board is frictionally held in place; and a second stand extending from a second surface of the second planar board, the second stand being attached to the second surface by a second hinge, the second hinge adapted to toggle the second stand between two or more different angular positions with respect to the second surface of the second planar board.

12. The system of claim 11, wherein the writing surface is a blackboard.

13. The system of claim 11, wherein the writing surface is a whiteboard.

14. The system of claim 11, wherein the plurality of alpha-numeric characters is the complete English alphabet.

15. The system of claim 11, wherein the plurality of alpha-numeric characters is numbers and mathematics symbols.

16. The system of claim 11, wherein each of the characters of the plurality of alpha-numeric characters has one or more magnets which correspond to and attach to a corresponding magnet attached to the front surface of the first planar board.

17. The system of claim 11, wherein each of the characters of the plurality of alpha-numeric characters has one or more strips of hook & loop fasteners which correspond to and attach to corresponding hook & loop fasteners affixed to the front surface of the first planar board.

* * * * *